United States Patent [19]

Aronow

[11] Patent Number: 5,521,960
[45] Date of Patent: May 28, 1996

[54] INTERACTIVE TELEPHONIC DEVICE FOR 'VCO' RELAY COMMUNICATION

[76] Inventor: Alan H. Aronow, One River Rd., Weston, Conn. 06883

[21] Appl. No.: 324,751

[22] Filed: Oct. 3, 1994

[51] Int. Cl.⁶ .................................. H04M 11/00
[52] U.S. Cl. .......................... 379/52; 379/96; 340/825.19
[58] Field of Search ................. 379/52, 58, 68, 379/70, 93, 96–100, 375, 376, 389, 90, 110; 340/825.19; 348/62

[56] References Cited

U.S. PATENT DOCUMENTS

| | | | |
|---|---|---|---|
| 4,268,721 | 5/1981 | Nielson et al. | 379/52 |
| 4,608,457 | 8/1986 | Fowler et al. | 379/52 |
| 4,674,112 | 6/1987 | Kondraske et al. | 379/52 |
| 4,754,474 | 6/1988 | Feinson | 379/52 |
| 5,081,673 | 1/1992 | Engelke et al. | 379/52 |
| 5,163,081 | 11/1992 | Wycherley et al. | 379/52 |
| 5,280,519 | 1/1994 | Nakajima et al. | 370/100 |

*Primary Examiner*—Wing F. Chan

[57] ABSTRACT

An interactive telephonic apparatus having means of connectivity between a hearing impaired individual and the telephone RELAY system employing 'Voice Carrier Over' (VCO) technology. The design of this apparatus and means of operation eliminate the keyboard controls and handset now employed in 'Telephone Devices for the Deaf' (TDD). The resulting apparatus provides hearing impaired individuals, especially those of advanced age with mental, mobility and visual deficiencies, simplified low cost access to the telephone RELAY system.

1 Claim, 2 Drawing Sheets

INTERACTIVE TELEPHONIC DEVICE FOR 'VCO' RELAY COMMUNICATION

FIELD OF THE INVENTION

The present invention relates generally to telephonic interface devices allowing a hearing impaired individual to communicate with a hearing individual using the services of the RELAY.

REFERENCES CITED

U.S. Pat. No. 4,608,457—August 1986—Fowler et al.
U.S. Pat. No. 4,754,474—June 1988—Feinson
U.S. Pat. No. 5,081,673—January 1992—Engelke et al.
U.S. Pat. No. 5,163,081—October 1992—Wycherley et al.
U.S. Pat. No. 5,280,519—January 1994—Nakajima et al.

BACKGROUND OF THE INVENTION

Many individuals with severe hearing loss may not be able to communicate effectively over standard voice grade telephone lines using conventional telephones. Since the 1960's, devices have been available making communication between hearing impaired individuals possible.

These devices, known as TDD's or Telephone Devices for the Deaf operate by having a hearing impaired individual type into a keyboard the message to be sent to the other hearing impaired party. The TDD is capable of generating a coded signal which is transmitted via modem over telephone wires to the other similarly equipped device which then receives, decodes and displays the message on a visual and/or printed display. This procedure is repeated between the individuals until the communication is completed. The process described is entirely manual and nonverbal in nature and is considerably slower and more cumbersome than conventional verbal telephone usage.

The specialized TDD equipment, while having come down substantially in price over the years is still costly in comparison to basic voice grade telephone receivers and not readily available commercially as this product has been primarily marketed to deaf individuals who as a group represent less than 0.5% of the total American population.

In recent years, especially following the enactment into law of the 'Americans with Disabilities Act', efforts have been made to provide and standardize the methodology allowing hearing impaired individuals equipped with TDD equipment to communicate telephonically with normal hearing individuals not equipped with a TDD device. To effectuate this capability, RELAYS centers have been established by major telephone carriers (like AT&T, Sprint,MCI, etc). A RELAY center provides trained operators equipped to receive telephone calls from either the heating impaired using TDD's or from those with normal hearing calling in on standard telephone equipment. The RELAY operator's function is to dial the desired party and serve as a go-between the heating and hearing impaired parties. In the typical situation, the TDD equipped individual keystrokes the sending message to the RELAY operator who then voices this message to the hearing party who listens to the RELAY operator on their telephone handset as they would in a normal phone call. In reply, the hearing party voices the content of their message to the RELAY operator who provides real, time speech to text captioning for the hearing impaired by keying the voiced communication into equipment capable of transmitting coded signals to the TDD user. The TDD decodes the message, making it available to the hearing impaired user via a visual display device or paper tape printer. This process is repeated until the conversation is completed.

The initial concept of the RELAY system was designed to provide TDD equipped deaf individuals access to the hearing world. For the most part this arrangement has worked well in part because the deaf population has traditionally relied on nonverbal means of communication and has used the keyboard based TDD for over 30 years as a means of communication telephonically. The RELAY has opened up new telephonic opportunities to this population without any necessity to modify their basic typed text to text communication format.

Important to the development of this invention has been the recent introduction into the RELAY system of the capability of providing a voice bridge, known as 'Voice Carrier Over' or VCO which allows the hearing impaired with speech faculties to speak directly to the hearing party. In the typical case, a TDD equipped individual dial up the RELAY service and indicates to the RELAY operator via keyed in instructions that they desire this call to be a VCO call. Once the RELAY operator sets up the proper equipment settings on their computer terminal, the hearing impaired party is instructed to begin speaking into their telephone handset. At this point the RELAY operator listens to the hearing impaired caller instead of watching for TDD originated text transmission. The RELAY operator then dials the third party hearing individual and explains the VCO operating protocols. In practice, a VCO calls works the same way as a traditional RELAY call except that the heating impaired speaks rather than keystrokes to the other party. Upon instruction the RELAY operator manually flips a switch allowing the voice bridge to be established. Once the hearing impaired has finished their segment of conversation (normally done by saying the words 'Go Ahead') the RELAY operator closes the voice bridge and resets the control equipment to begin transmitting coded signals to the TDD user representing the speech to text captioning of the hearing persons segment of the conversation.

While not all deaf individuals have adequate speech skills for this VCO, this arrangement provides a more natural, spontaneous and direct method of communicating and relieves the RELAY agent of the necessity of actively participating in what was formerly the text to speech aspect of the role as a go-between between the two parties. VCO is now a standard feature in the RELAY system throughout the United States and in other countries around the world.

Voice Carrier Over capability in the RELAY system is a critical innovation for many reasons. In the past, TDD usage was essentially restricted to deaf individuals, their friends and family's and various government and business organizations. The RELAY added tremendous opportunities for deaf individuals to communicate with the 'outside' hearing world. In this role the RELAY provides a valuable service for those people already equipped with TDD equipment to communicate outside the small circle of other TDD users.

With the advent of VCO, the potential exists for the RELAY to make communications capabilities accessible to a much larger potential segment of the population representing those individuals who while they are hearing impaired are not deaf. This population has grown up in the 'normal' hearing world and for the most part have lost their heating later in life after having developed speech and cultural patterns significantly different from individuals who are deaf.

In America, there are over 21 million individuals classified as hearing impaired. Of this group less than one million are classified as deaf. There exists an additional four to six million people whose residual hearing loss is severe enough to make conventional telephone communication (even with amplification) impossible. Hearing impairment is often a progressive disability. Usually it develops slowly affecting people later in life long after adequate speech skills have been acquired. Most severely hearing impaired have excellent speaking voices . . . the problem is that they simply cannot hear well enough to communicate effectively over regular telephone equipment. Because many hearing impaired individuals grow up in a hearing environment they have little identification or participation in the deaf cultural world and rarely learn nonverbal forms of communication such as sign language nor have they seen or used TDD equipment as a means of telephonic communication.

Very often hearing impaired, specifically those who cannot utilize normal telephone service are senior citizens with other disabilities such reduced visual, mental and mobility faculties. These individuals have great difficulty in adapting to and utilizing the conventional TDD because essentially the TDD is a modem based typewriter with a display. Because the TDD was designed to be used as a communication typewriter it has no self contained audio input (except for the use of a telephone handset), utilizes a small display screen that is horizontally mounted on the top of the TDD and requires many cumbersome programming routines (hitting various keys in specific sequence or in various combinations) which must be learned in order to dial up the RELAY service, retrieve messages, and for other functions. Most significantly, TDD's are very expensive, at present the least expensive costing in excess of $200 a retail. Quite often these factors represent obstacles, especially for older hearing impaired individuals and have served to discourage TDD distribution and usage outside of the deaf community.

In an effort to broaden the appeal of TDD's newer models have recently been introduced incorporating streamlined cabinet design attempting to make the TDD look more like a conventional telephone. These changes have lowered costs somewhat but have done little to improve the TDD's keyboard based operating characteristics and inherent design limitations.

Due to the complexity and expense of keyboard based TDD's little effort has been made to market the conventional TDD to the larger group of hearing impaired but non-deaf individuals, especially senior citizens. This seems strange because it is precisely this population of hearing impaired that could benefit the most from the VCO service now routinely provided by the RELAY service. Since one must be equipped with a TDD (or modem equipped personal computer) to access the RELAY very few nondeafened hearing impaired individuals are able to utilize the RELAY service and are therefore effectively denied access to telephonic communication. This is specifically in contradiction with Federal law—Title IV of the *Americans with Disabilities Act* (ADA).

The present invention was developed to try to overcome the design limitations of the conventional TDD with the specific purpose of making available to the hearing impaired with speech capabilities a low cost, self contained telephonic interface device requiring no programming for operation, no telephone hookup for audio transmission and a display screen assembly which can be seen comfortably at any viewing angle. This device would be a dedicated instrument whose sole function is to dial into and receive transmission from the RELAY utilizing voice bridge technology and differs significantly both in design and operation from all TDD devices now currently available.

SUMMARY OF THE INVENTION

It is thus an object of this invention to provide a novel apparatus to assist the hearing impaired with telecommunications by providing a simple, easy to operate, non keyboard based device to interface with the VCO capabilities of the RELAY.

It is further the object of this invention to provide such a novel telecommunication device which has the means to receive and process speech utilizing an integrated automatic gain microphone and transmit this speech over telephone lines via the RELAY to another party. This component is novel in TDD applications and therefore overcomes one of the significant problems in VCO communications caused by the acoustic feedback generated by a hearing aid when a user places a conventional telephone handset up against their ear containing a hearing aid. In general usage, the acoustic feedback is loud and painful and discourages use of VCO RELAY connectivity.

It is a further and now particular object of this invention to provide a telecommunication device which requires no programming for the user in order to dial into the RELAY service. This invention has a dedicated autodialer which is preprogrammed to call the singular telephone number gaining access to RELAY services. While this singular telephone number can be modified at a later date, it is 'branded' into the device before delivery to the user and therefore requires no participation from the user to program. Further, all functions of this invention are activated by a single oversized illuminated control switch mounted in such a fashion as to provide easy of access and operation. These novel features are critical for older users, especially those with deficient mental, visual or mobility skills.

It is a further and more particular aspect of this device to have preprogrammed into memory a coded message which automatically informs the RELAY operator that the user is unavailable at the present time and that a message can be transmitted, recorded, stored and retrieved at a later date. This novel feature differs from existing devices in that existing devices require the user to create their own messages by typing and punching a sequence of programming instructions into their TDD. These steps are often times baffling to older users who have little experience with electronic instruments and are intimidated by the seeming complexity of the programming required to achieve this benefit in conventional TDD's.

It is a still further and yet a more particular object of this invention to provide an oversized visual display (with extra large characters) allowing the user to sit a comfortable distance from the device and be able to read the display screen with great ease. At present TDD devices are equipped with display devices mounted horizontal to the viewer and require the user to sit directly in front of the TDD device looking downwards in order to view what is moving across the screen. In this invention, the display device shall be housed at a vertical inclination providing a more natural and comfortable viewing angle thereby increasing clarity and comprehension.

DETAILED DESCRIPTION

Figure 1:
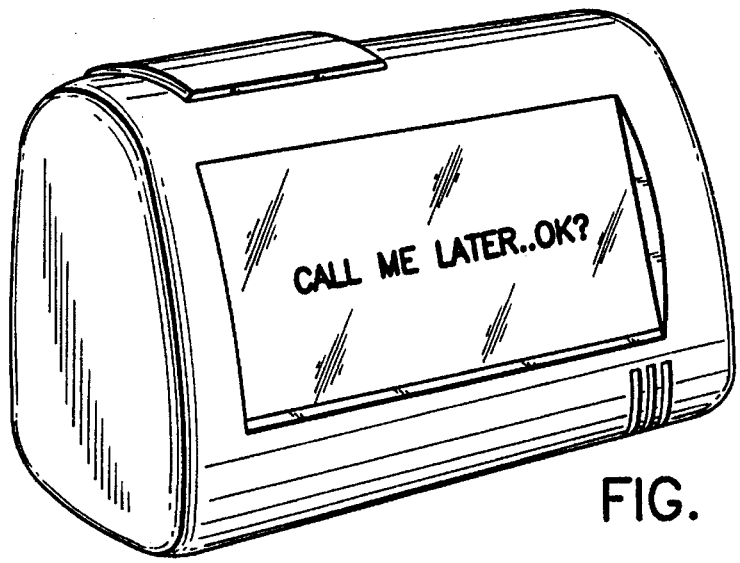
FIG. 1—Illustrates a perspective view of the apparatus
Figure 2:
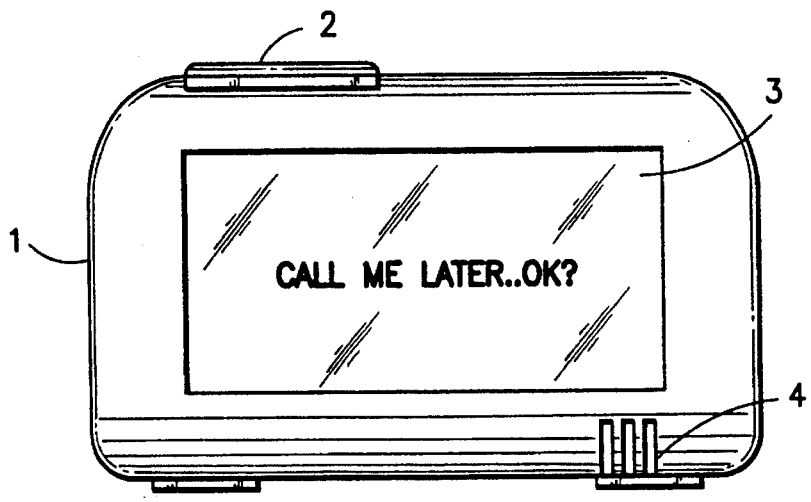
FIG. 2—Illustrates a front view of the apparatus
Figure 3:
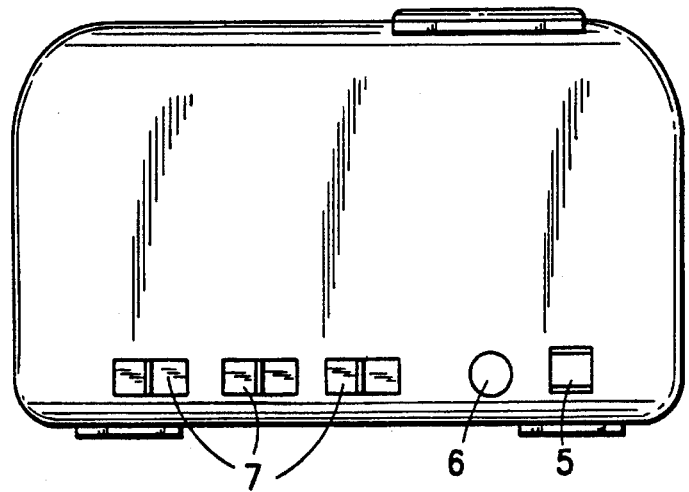
FIG. 3—Illustrates a rear view of the apparatus
Figure 4:
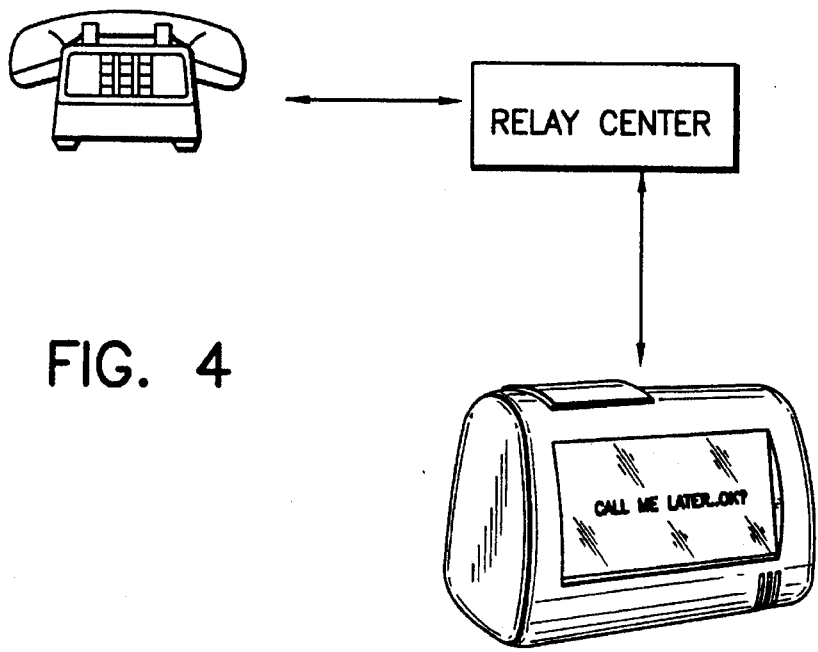
FIG. 4—Illustrates schematic view of operation
Figure 5:
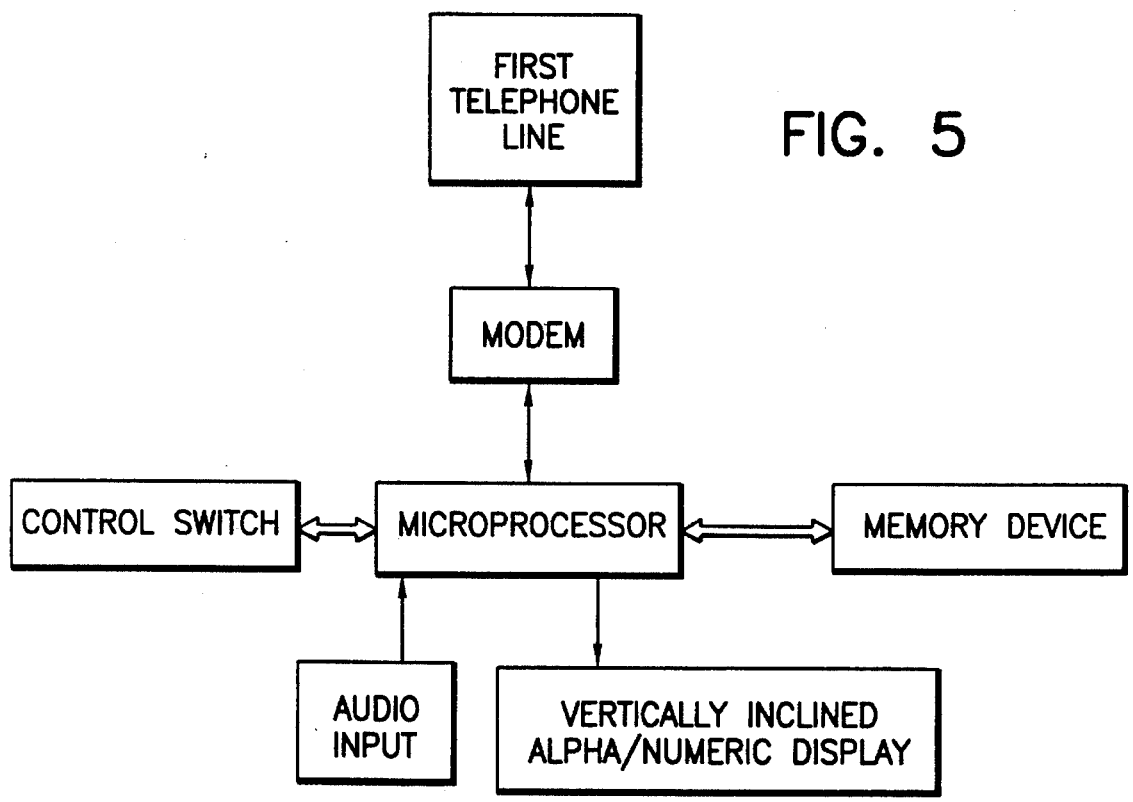
FIG. 5—Illustrates block diagram of operation

In accordance with this invention, the apparatus has the distinct advantage of providing the user the full range of VCO capabilities without the need for a conventional keyboard based TDD or personal computer to interface with the RELAY. Various other advantages and features will become apparent from a reading of the following description given with reference to various figures of drawings.

In general terms, the use of this apparatus is as follows:

The apparatus is attached to the telephone service line at connection 5. The apparatus is designed to be connected directly to the telephone service line or may be connected to a conventional telephone device by employment of a simple dual coupling adapter supplied with the unit. Once connected to a telephone service line, the user attaches the power supply at plug 6 to a standard 120 volt electrical outlet. The power supply is used to recharge the self contained battery power source used to operate the device. The apparatus will operate without outside power source while the batteries are charged.

Making Calls

Once the apparatus 1 is connected, the user can operate the device by depressing illuminated control switch 2. This action activates a serf contained means of dialing (pulse/tone) preprogrammed telephone number for the RELAY service. Once activated by the illuminated control switch 2, the display device 3 is automatically switched on and displays information confirming to the user that the apparatus is dialing the RELAY.

The apparatus has the means such as microprocessor, modem, memory, etc., . . . employed in all TDD equipment of generating, transmitting and receiving and decoding signals which are communicated between the apparatus and RELAY via a modem. This invention will utilize conventional signal generation circuitry and modem technology.

Once the unit connects with the RELAY service the apparatus shall have the means of generating a preprogrammed signal notifying the RELAY operator that this transmission will be a VCO style call. Once alerted the RELAY operator will then communicate to the apparatus user using the standard dialogue protocols developed by the RELAY service and inform the apparatus user that they may begin to speak. This information is viewed by the apparatus user on display screen 3.

Once informed that they may begin speaking, the apparatus user speaks at a normal level towards microphone 4 which is equipped with automatic gain control. Should the apparatus user so desire, a conventional telephone handset may be used (after having connected the apparatus to conventional telephone by means of a dual coupling connector) instead of the microphone 4. Whenever the handset is lifted from the telephone's cradle, circuitry will automatically disable the microphone 4 and all voice transmissions will originate from the telephone handset's microphone. In either case, voice grade transmission shall be communicated via the telephone lines to the RELAY service and the RELAY operator shall be able to hear the apparatus user's voiced transmission. Once the apparatus is connected with a RELAY operator and the VCO sequencing has been established the user begins to follow the communications protocol established by the RELAY service.

In the typical case, the RELAY operator requests the telephone number that the apparatus user wants dialed by transmitting this request in text form to the apparatus which decodes this transmission and displays this information on display screen 3. The apparatus user begins speaking after seeing screen display "GA" which is the universal command for GO AHEAD. The apparatus user begins to voice the request and ends by saying 'Go Ahead' to the RELAY operator. The RELAY operator hears this transmission and notifies the apparatus owner via text that they are dialing the requested number. Once the requested number is answered the RELAY operator informs the called party via speech that there is a RELAY call and if necessary, instructs how the RELAY works. Once informed, the dialogue between the apparatus user and the called party can commence with the RELAY operator serving in the capacity of go-between. The RELAY operator's function is to activate control switches upon hearing the 'Go Ahead' command from either party allowing the VCO circuitry to transmit the apparatus users voice directly to the called party. Once the hearing party begins to speak, the RELAY operator begins keying in a real time speech to text captioning for the benefit of the apparatus user which is transmitted via coded-signals to the apparatus which then decodes the signals and displays this information on screen 3.

Once the dialogue between the apparatus user and called party is complete the RELAY operator will query the apparatus user if there are any further calls requested. If there are none, the RELAY operator will indicate that they should go to 'SK' the protocol language for GOODBYE and will terminate the connection. The apparatus has the means of detecting the change in the line condition and will automatically reset the apparatus into a mode making it available to receive incoming calls.

Receiving Calls:

The apparatus has the means of receiving incoming calls and signaling to the user via both internal audible ringer and flashing light assemble contained within the control switch 2.

In normal operation the apparatus may be answered simply by depressing the control switch 2. Once activated the apparatus will send a preprogrammed signal to the RELAY operator indicating that this is a VCO call. The apparatus will then activate the display 3 and communication with the RELAY may commence as described above.

Should the apparatus receive a call from a source other then the RELAY the apparatus shall have the means of detecting this nonconforming signal and disconnect and then reset the apparatus to await future calls. For homes with both conventional telephones and this invention sharing a single telephone exchange number it is possible to incorporate into this apparatus circuitry which can detect the nature of the signal (voice vs. coded) and bypass the apparatus allowing other telephones within the household to ring and operate normally.

Should the user not answer the phone within a prescribed number of rings, the apparatus is programmed to respond to incoming calls in one of two modes. The unit is preset at a default setting (mode#2) and will operate in this mode unless otherwise modified by the user by setting control switch 7 on the unit. The two modes are:

Mode #1: The apparatus does not answer any incoming calls. In effect the unit is turned off.

Mode #2: The apparatus is programmed to answer all incoming calls if the user fails to pick up with the prescribed number of tings. Upon activation the apparatus generates a coded salutation to the RELAY operator "PLEASE LEAVE A MESSAGE WITH YOUR NAME, TELEPHONE NUMBER AND TIME OF DAY . . . THANK YOU . . . GA OR SK". Upon seeing this prompt, the RELAY operator informs the calling party and if so desired a message can be conveyed via the RELAY operator to the apparatus in for storage and later retrieval. Following the transmission of the message, the RELAY operator disconnects the line and the apparatus upon detecting the break in the line automatically turns off and resets to await fixture calls.

In Mode#2, the apparatus has the means of alerting the user that a message(s) is in storage and ready for retrieval. This is accomplished by automatically activating the illuminated control switch 2 and having it flash on/off rapidly. In addition the apparatus will then automatically turn on the screen 3 and display the message. "TO VIEW MESSAGES—TOUCH BLINKING LIGHT NOW". The user can then depress the control switch 2 and the apparatus will slowly scroll through the stored message(s) until all data is displayed. At the completion of this retrieval, the screen 3 will then display the following "TO VIEW MESSAGES AGAIN—TOUCH BLINKING LIGHT NOW". If switch 3 is depressed the retrieval process is repeated for a second time. If switch 3 is not depressed within 30 seconds, the apparatus automatically resets the device to the waiting for next call status and erases all data stored in the data memory. The apparatus is programmed to temporarily bypass the message mode while an incoming call or outgoing call is in progress.

For the hearing impaired individual especially those of advance age or with mental, visual or mobility defects, the invention provides a very simple means of being able to connect telephonically with the RELAY for VCO service. Because of it's small size, lack of keyboard and complicated controls, vertical screen, build-in microphone and automated screen instructions, the apparatus can be produced at a fraction of the cost of current TDD's thereby making it possible to distribute this invention to a large segment of hearing impaired population who neither need nor efficiently operate keyboard based TDD equipment but who in the absence of an other interactive device are without means to communicate telephonic.

The invention's novel means of providing low cost access VCO to the RELAY service is currently designed to utilize a direct wired connection into telephone network lines but greater mobility for this invention might be achieved in future versions by adding cordless and cellular transmission capabilities thereby freeing the device from being used in a fixed location.

It is claimed that:

1. A interactive telephonic device for use by the hearing impaired with means of connectivity directly to RELAY services with Voice Carrier Over capabilities comprising:

a) a first telephone line, b) a modem capable of sending and receiving coded data signals over the first telephone line directly from a RELAY service, c) a vertically inclined visual display device, d) a memory device capable of dialing a specific telephone number to obtain connection to the RELAY service, e) a microprocessor operating in accordance with a program code and connected to detect incoming transmission over the first telephone line and means to process said coded data signals from the RELAY service into alphabetic, numeric and punctuation characters which may be presented immediately on a visually readable display screen or held in storage for later retrieval and presentation into visible form, f) a microprocessor and memory devices operating to send coded preprogrammed data signals over the first telephone line in order to communicate information with the RELAY service, g) a self contained audio input source and means of transmitting voice messages over the first telephone line to the RELAY service (and listening party), h) control switch connected to said microprocessor for controlling all operating functions of the interactive telephonic device.

\* \* \* \* \*